US008938971B2

(12) United States Patent
Poyyapakkam et al.

(10) Patent No.: US 8,938,971 B2
(45) Date of Patent: Jan. 27, 2015

(54) FLOW STRAIGHTENER AND MIXER

(75) Inventors: Madhavan Narasimhan Poyyapakkam, Rotkreuz (CH); Khawar Syed, Oberrohrdorf (CH); Satish Kumar Gajula, Mysore (IN); John Philip Wood, Rütihof (CH)

(73) Assignee: Alstom Technology Ltd, Baden (CH)

( * ) Notice: Subject to any disclaimer, the term of this patent is extended or adjusted under 35 U.S.C. 154(b) by 20 days.

(21) Appl. No.: 13/469,819

(22) Filed: May 11, 2012

(65) Prior Publication Data

US 2012/0297787 A1 Nov. 29, 2012

(30) Foreign Application Priority Data

May 11, 2011 (CH) ...................................... 0795/11

(51) Int. Cl.

| | |
|---|---|
| ***F02K 1/00*** | (2006.01) |
| ***B64D 33/04*** | (2006.01) |
| ***F23R 3/34*** | (2006.01) |
| ***B01F 5/04*** | (2006.01) |
| ***B01F 5/06*** | (2006.01) |
| ***F23D 14/62*** | (2006.01) |
| ***F23R 3/18*** | (2006.01) |

(Continued)

(52) U.S. Cl.

CPC ................. *F23R 3/34* (2013.01); *B01F 5/0451* (2013.01); *B01F 5/0456* (2013.01); *B01F 5/0463* (2013.01); *B01F 5/0616* (2013.01); *F23D 14/62* (2013.01); *F23R 3/18* (2013.01); *F23R 3/20* (2013.01); *F23R 3/286* (2013.01); *F23R 2900/03341* (2013.01)

USPC ....................................... 60/770; 239/265.13

(58) Field of Classification Search

USPC ................ 60/39.5, 226.1, 262, 770; 181/213; 239/265.13, 265.37

See application file for complete search history.

(56) References Cited

U.S. PATENT DOCUMENTS 3,100,627 A 8/1963 Wilde
3,620,012 A * 11/1971 Wilde ............................ 60/804

(Continued)

FOREIGN PATENT DOCUMENTS

EP 0 244 336 A2 11/1987
EP 0 321 379 A2 6/1989

(Continued)

OTHER PUBLICATIONS

Hendricks "Modeling of a Sequential Two-Stage Combustor",2005, NASA/TM.*

(Continued)

*Primary Examiner* — Phutthiwat Wongwian
*Assistant Examiner* — William Breazeal
(74) *Attorney, Agent, or Firm* — Buchanan Ingersoll & Rooney PC

(57) ABSTRACT

A combined flow straightener and mixer is disclosed as well as a burner for a combustion chamber of a gas turbine having such a mixing device. At least two streamlined bodies are arranged in a structure comprising the side walls of the mixer. The leading edge area of each streamlined body has a profile, which is oriented parallel to a main flow direction prevailing at the leading edge position, and with reference to a central plane of the streamlined bodies, the trailing edges are provided with at least two lobes in opposite transverse directions. The periodic deflections forming the lobes from two adjacent streamlined bodies are out of phase.

19 Claims, 8 Drawing Sheets

(51) Int. Cl.
*F23R 3/20* (2006.01)
*F23R 3/28* (2006.01)

(56) References Cited

U.S. PATENT DOCUMENTS

| | | | | |
|---|---|---|---|---|
| 3,937,008 | A * | 2/1976 | Markowski et al. ............ | 60/776 |
| 4,401,269 | A | 8/1983 | Eiler | |
| 4,835,961 | A * | 6/1989 | Presz et al. ...................... | 60/264 |
| 4,932,861 | A | 6/1990 | Keller et al. | |
| 5,431,018 | A | 7/1995 | Keller | |
| 5,626,017 | A | 5/1997 | Sattelmayer | |
| 2002/0187448 | A1 | 12/2002 | Eroglu et al. | |
| 2006/0156734 | A1 | 7/2006 | Bland | |
| 2009/0184181 | A1 | 7/2009 | Berry et al. | |

FOREIGN PATENT DOCUMENTS

| | | | |
|---|---|---|---|
| EP | 0 623 786 | A1 | 11/1994 |
| EP | 1 257 809 | A | 11/2002 |
| EP | 1 894 616 | A1 | 3/2008 |

OTHER PUBLICATIONS

A. J. Majamaki, "Passive Mixing Control via Lobed Injectors in High-Speed Flow", 2003, AIAA Journal teaches an lobed injector where the injector is along the central plane of the streamlined body.*
GE Energy, Syngas Turbine Technology, Sep. 2010, p. 3.*
Extended European Search Report dated Sep. 12, 2012, issued by the European Patent Office in the corresponding European Application No. 12167781.9. (8 pages).

* cited by examiner

FLOW STRAIGHTENER AND MIXER

RELATED APPLICATION

This application claims priority under 35 U.S.C. §119 to Swiss Patent Application No. 00795/11 filed in Switzerland on May 11, 2011, the entire content of which is hereby incorporated by reference in its entirety.

FIELD

A combined flow straightener and mixer is disclosed, as well as a burner for a combustion chamber of a gas turbine having such a device. For example, a flow straightener and mixer can include with an injection device for the introduction of at least one gaseous and/or liquid.

BACKGROUND INFORMATION

Mixing devices are used for various technical applications. Optimization of mixing devices aims at reducing the energy used to obtain a specified degree of homogeneity. In continuous flow mixing the pressure drop over a mixing device is a measure for the energy involved. Further, the time and space used to obtain the specified degree of homogeneity can be important parameters when evaluating mixing devices or mixing elements. Static mixers are have been used for mixing of two continuous fluid streams.

High volume flows of gas are for example mixed at the outlet of turbofan engines, where the hot exhaust gases of the core engine mix with relatively cold and slower bypass air. In order to reduce the sound emissions caused by these different flows lobe mixers were suggested for example in U.S. Pat. No. 4,401,269.

One specific application for mixing of continuous flow streams is the mixing of a fuel with an oxidizing fluid, for example air, in a burner for premixed combustion in a subsequent combustion chamber. In modern gas turbines good mixing of fuel and combustion air can be a prerequisite for complete combustion with low emissions.

In order to achieve a high efficiency, a high turbine inlet temperature is used in standard gas turbines. As a result, there can arise high NOx emission levels and higher life cycle costs. These aspects can be mitigated with a sequential combustion cycle, wherein the compressor delivers nearly double the pressure ratio of a known one. The main flow passes the first combustion chamber (e.g. using a burner of the general type as disclosed in EP 1 257 809 or as in U.S. Pat. No. 4,932,861, also called EV combustor, where the EV stands for EnVironmental), wherein a part of the fuel is combusted. After expanding at the high-pressure turbine stage, the remaining fuel is added and combusted (e.g. using a burner of the type as disclosed in U.S. Pat. No. 5,431,018 or U.S. Pat. No. 5,626,017 or in US 2002/0187448, also called SEV combustor, where the S stands for sequential). Both combustors contain premixing burners, as low NOx emissions can involve high mixing quality of the fuel and the oxidizer.

Since the second combustor is fed by the expanded exhaust gas of the first combustor, the operating conditions allow self ignition (spontaneous ignition) of the fuel air mixture without additional energy being supplied to the mixture. To prevent ignition of the fuel air mixture in the mixing region, the residence time therein should not exceed the auto ignition delay time. This criterion can ensure flame-free zones inside the burner. This criterion can pose challenges in obtaining appropriate distribution of the fuel across the burner exit area.

SEV-burners are currently only designed for operation on natural gas and oil. Therefore, the momentum flux of the fuel is adjusted relative to the momentum flux of the main flow so as to penetrate in to the vortices. This can be done using air from the last compressor stage (high-pressure carrier air). The high-pressure carrier air is bypassing the high-pressure turbine. The subsequent mixing of the fuel and the oxidizer at the exit of the mixing zone is just sufficient to allow low NOx emissions (mixing quality) and avoid flashback (residence time), which may be caused by auto ignition of the fuel air mixture in the mixing zone.

SUMMARY

A flow straightener and mixing device is disclosed comprising: a structure with walls having a longitudinal axis; an inlet area; an outlet area in a main flow direction; at least two streamlined bodies, which are arranged in the flow straightener and mixing device, each having a streamlined cross-sectional profile, which extends with a longitudinal direction perpendicularly or at an inclination to the main flow direction of the flow straightener and mixing device, wherein a leading edge area of each streamlined body has a profile, which is oriented parallel to the main flow direction at a leading edge position, and wherein, with reference to a central plane of the streamlined bodies the trailing edges are provided with at least two lobes in opposite transverse directions, wherein a traverse deflection from the central plane of two adjacent streamlined bodies, which form the lobes, are inverted, and wherein a transition from a planar leading edge region to the deflection is smooth with a surface curvature representing a function with a continuous first derivative.

A method for operating a flow straightener and mixing device in combination with a burner for a combination chamber of a gas turbine, the fuel straightener and mixing device having: a structure with walls having a longitudinal axis; an inlet area; an outlet area in a main flow direction; at least two streamlined bodies, which are arranged in the flow straightener and mixing device, each having a streamlined cross-sectional profile, which extends with a longitudinal direction perpendicularly or at an inclination to the main flow direction of the flow straightener and mixing device, wherein a leading edge area of each streamlined body has a profile, which is oriented parallel to the main flow direction at a leading edge position, and wherein, with reference to a central plane of the streamlined bodies the trailing edges are provided with at least two lobes in opposite transverse directions, wherein a traverse deflection from the central plane of two adjacent streamlined bodies, which form the lobes, are inverted, and wherein a transition from a planar leading edge region to the deflection is smooth with a surface curvature representing a function with a continuous first derivative, wherein the method comprises: determining a number of fuel injection nozzles through which fuel is injected as function of total injected fuel flow; and injecting fuel through the fuel injection nozzles.

BRIEF DESCRIPTION OF THE DRAWINGS

Exemplary embodiments are described in the following with reference to the drawings, which are for the purpose of illustrating preferred embodiments and not for the purpose of limiting the same. In the drawings.

DETAILED DESCRIPTION

Figure 1:
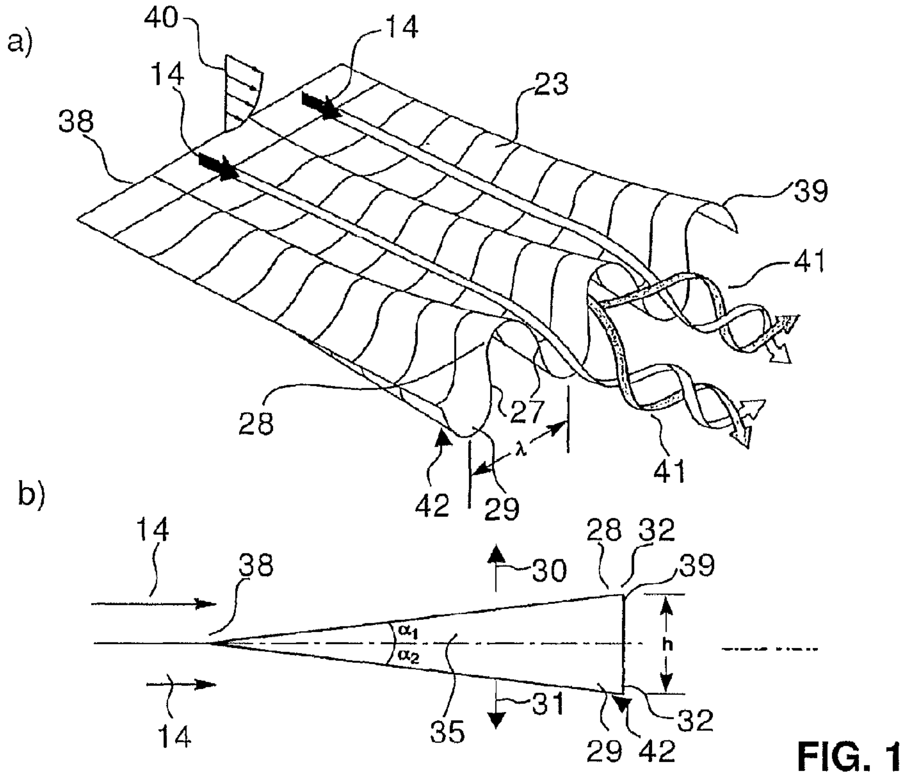
FIG. 1 shows in *a*) a schematic perspective view onto an exemplary lobed streamlined body and the flow paths generated on both sides and at the trailing edge thereof; and in *b*) a side elevation view thereof.

A highly effective mixer is disclosed with a low pressure drop. As an application of such a mixer, a burner comprising such a mixer is disclosed. Such a burner can be particularly advantageous for high reactivity conditions (e.g., either for a situation where the inlet temperature of a burner is high, and/or for a situation where high reactivity fuels, specifically MBtu fuels, shall be burned in such burner).

First of all a mixer, which produces a mixture with a high homogeneity using only a minimum pressure drop, is proposed. Further, a burner with such a mixer is proposed. Such a burner is proposed to increase the gas turbine engine efficiency, to increase the fuel capability as well as to simplify the design.

Exemplary embodiments include a flow straightener and mixing device comprising a structure with limiting walls having a longitudinal axis an inlet area, and an outlet area in the main flow direction. For the combined function of flow straightening and mixing at least two streamlined bodies are arranged in the structure. Each streamlined body has a streamlined cross-sectional profile, which extends with a longitudinal direction perpendicularly or at an inclination to a main flow direction, which prevails in the flow straightener and mixing device. The leading edge area of each streamlined body has a profile, which is oriented parallel to a main flow direction prevailing at the leading edge position, and wherein, with reference to a central plane of the streamlined bodies the trailing edges are provided with at least two lobes in opposite transverse directions. It has been found that inverting the traverse deflection from the central plane of two adjacent streamlined bodies, which form the lobes, is particularly advantageous for efficient and fast mixing. In other words the periodic deflections from two adjacent streamlined bodies are out of phase: at the same position in longitudinal direction the deflection of each body has the same absolute value but is in opposite direction. Further, to minimize the pressure drop and to avoid any wakes the transition from a planar leading edge region to the deflections is smooth with a surface curvature representing a function with a continuous first derivative.

Streamlined bodies with a combination of a leading edge area with an aerodynamic profile for flow straightening and with a lobed trailing edge for mixing can be especially advantageous for mixing of flows with an inhomogeneous flow profile at the inlet area. Without the flow straightening the turbulent dissipation pattern created by the lobes is disturbed and only partial mixing takes place.

The aerodynamic profile can comprise a leading edge region with a round leading edge, and a thickness distribution with a maximum thickness in the front half of the profile.

In an exemplary embodiment the rear section has a constant thickness distribution. The rear section with constant thickness distribution extends for example at least 30% of the profile length from the trailing edge. In a further embodiment the rear section with constant thickness distribution extends 50% or even up to 80% of the profile length.

Additionally the rear section with constant thickness distribution can comprise the lobed section.

The lobes alternatingly extend out of the central plane (e.g., in the transverse direction with respect to the central plane). The shape can be a sequence of semi-circles, sectors of circles, it can be in a sinus or sinusoidal form, it may also be in the form of a combination of sectors of circles or sinusoidal curves and adjunct straight sections, where the straight sections are asymptotic to the curves or sectors of circles. For example, all lobes are of essentially the same shape along the trailing edge. The lobes are arranged adjacent to each other so that they form an interconnected trailing edge line. The lobe angles should be chosen in such a way that flow separation is avoided. According to one embodiment lobe angles ($\alpha_1$, $\alpha_2$) are, for example, between 15° and 45°, such as between 25° and 35° to avoid flow separation.

According to an exemplary embodiment, the trailing edge is provided with at least 3 (e.g., at least 4) lobes sequentially arranged one adjacent to the next along the trailing edge, and alternatingly lobing in the two opposite transverse directions.

A further exemplary embodiment is characterized in that the streamlined body comprises an essentially straight leading edge. The leading edge may however also be rounded, bent or slightly twisted.

According to a further exemplary embodiment, the streamlined body, in its straight upstream portion with respect to the main flow direction, has a maximum width. Downstream of this width W the width (e.g., the distance between the lateral sidewalls defining the streamlined body), essentially continuously diminishes towards the trailing edge (the trailing edge either forming a sharp edge or rounded edge). The height, defined as the distance in the transverse direction of the apexes of adjacent lobes, is in this case for example, at least half of the maximum width. According to an exemplary embodiment, this height is approximately the same as the maximum width of the streamlined body. According to another exemplary embodiment, this height is approximately twice the maximum width of the streamlined body. Generally speaking, the height can be at least as large as the maximum width, preferably not more than three times as large as the maximum width.

According to an exemplary embodiment, the flow straightener and mixing device's streamlined bodies comprises an essentially straight leading edge.

A flow, which is practically parallel to the longitudinal axis of the mixer, which is aligned with the central plane of the lobed section of the streamlined body, can be advantageous to optimize the flow conditions for the lobe mixing. To guide the flow in the parallel direction the leading edge region of the streamlined body has an aerodynamic profile, which is turning from an inclined orientation relative to the longitudinal axis of flow straightener and mixing device, to an orientation, which is parallel to the longitudinal axis of flow straightener and mixing device. This change in orientation can take place in the upstream half of the streamlined body.

According to a further exemplary embodiment, the transverse displacement of the streamlined body forming the lobes is only at most in the downstream two thirds of the length l (measured along the main flow direction) of the streamlined body. This means that the upstream portion the streamlined body can have an essentially symmetric shape with respect to the central plane. Downstream thereof the lobes are continuously and smoothly growing into each transverse direction forming a wavy shape of the sidewalls of the streamlined body where the amplitude of this wavy shape is increasing the maximum value at the trailing edge.

According to an exemplary embodiment, the distance between the central planes of two streamlined bodies is at least 1.2 times the height of the lobes, preferably at least 1.5 times the height of the lobes in order to optimize the flow pattern in the mixer, and to allow mixing normal to the central planes of two streamlined bodies as well as parallel to the central planes of two streamlined bodies.

According to a further exemplary embodiment the flow straightener and mixing device has a rectangular or trapezoidal cross section extending along the longitudinal axis. It is defined by four limiting walls, and comprises at least two streamlined bodies, which extend from one limiting wall to an opposing limiting wall, and which comprise at least two lobes in opposite transverse directions and wherein the traverse deflection from the central plane of two adjacent streamlined bodies are inverted.

According to a further exemplary embodiment the flow straightener and mixing device has an annular cross section, which extends along the longitudinal axis of the flow straightener and mixing device with an inner limiting wall and an outer limiting wall, which are concentric to each other. At least two streamlined bodies extend from the inner limiting wall to the outer limiting wall, and which comprise at least two lobes in opposite transverse directions and wherein the traverse deflection from the central plane of two adjacent streamlined bodies are inverted.

A burner is disclosed which can provide improved mixing. This can be achieved by providing a burner, in particular (but not exclusively) for a secondary combustion chamber of a gas turbine with sequential combustion having a first and a second combustion chamber, with an injection device for the introduction of at least one gaseous and/or liquid fuel into the burner, wherein the injection device has at least one body which is arranged in the burner with at least one nozzle for introducing the at least one fuel into the burner. The at least one body is configured as a streamlined body which has a streamlined cross-sectional profile and which extends with a longitudinal direction perpendicularly or at an inclination to a main flow direction prevailing in the burner. The at least one nozzle has its outlet orifice at or in a trailing edge (or somewhat downstream of the trailing edge) of the streamlined body. According to an exemplary embodiment, such a streamlined body is formed such that with reference to a central plane of the streamlined body the trailing edge is provided with at least two lobes in opposite transverse directions.

In other words the trailing edge does not form a straight line but a wavy or sinusoidal line, where this line oscillates around the central plane. Exemplary embodiments can involve injection of fuel at the trailing edge of the lobed injectors. The fuel injection is can be along the axial direction, which eliminates the need for high-pressure carrier air.

Exemplary embodiments can allow fuel-air mixing with low momentum flux ratios being possible. An inline fuel injection system includes number of lobed flutes staggered to each other.

The burner can be used for fuel-air mixing as well as mixing of fuel with any kind of gas used in closed or semi-closed gas turbines or with combustion gases of a first combustion stage.

These burners can be used for gas turbines comprising one compressor, one combustor and one turbine as well as for gas turbines with one or multiple compressors, at least two combustors and at least two turbines. They can for example be used as premix burners in a gas turbine with one combustor or also be used as a reheat combustor for a secondary combustion chamber of a gas turbine with sequential combustion having a first and a second combustion chamber, with an injection device for the introduction of at least one gaseous and/or liquid fuel into the burner.

The burner can be of any cross-section like basically rectangular or circular where for example, a plurality of burners is arranged coaxially around the axis of a gas turbine. The burner cross section is defined by a limiting wall, which for example forms a can like burner. At least two streamlined bodies extend from one side of the limiting wall to an opposing side of the limiting wall, and which comprise at least two lobes in opposite transverse directions and wherein the traverse deflection from the central plane of two adjacent streamlined bodies are inverted. Fuel can be injected into the burner from at leas one of the streamlined bodies.

In another exemplary embodiment the burner is arranged as an annular burner. In this embodiment the burner has an annular cross section, which extends along the longitudinal axis of the flow straightener and mixing device with an inner limiting wall and an outer limiting wall, which are concentric to each other. At least two streamlined bodies extend from the inner limiting wall to the outer limiting wall, and which comprise at least two lobes in opposite transverse directions and wherein the traverse deflection from the central plane of two adjacent streamlined bodies are inverted. Fuel can be injected into the burner from at least one of the streamlined bodies.

Exemplary embodiments allow reduced pressure losses by an innovative injector design. Exemplary advantages are as follows:

1. Increased GT efficiency
   a. The overall GT efficiency increases. The cooling air bypasses the high-pressure turbine, but it is compressed to a lower pressure level compared to normally necessary high-pressure carrier air and requires less or no cooling.
   b. Lobes can be shaped to produce appropriate flow structures. Intense shear of the vortices helps in rapid mixing and avoidance of low velocity pockets. An aerodynamically favored injection and mixing system reduces the pressure drop even further. Due to only having one device (injector) rather than the separate elements i) large-scale mixing device at the entrance of the burner, ii) vortex generators on the injector, and iii) injector pressure is saved. The savings can be utilized in order to increase the main flow velocity, which is beneficial if it comes to fuel air mixtures with high reactivity or can be utilized to increase the gas turbine performance.

2. The fuel may be injected in-line right at the location where the vortices are generated. The design of the cooling air passage can be simplified, as the fuel does not require momentum from high-pressure carrier air anymore.

Exemplary embodiments can merge the vortex generation aspect and the fuel injection device as conventionally used according to the state-of-the-art as a separate elements (separate structural vortex generator element upstream of separate fuel injection device) into one single combined vortex generation and fuel injection device. By doing this, mixing of fuels with oxidation air and vortex generation take place in very close spatial vicinity and very efficiently, such that more rapid mixing is possible and the length of the mixing zone can be reduced. It is even possible in some cases, by corresponding design and orientation of the body in the oxidizing air path, to omit the flow conditioning elements (turbine outlet guide vanes) as the body may also take over the flow conditioning. All this is possible without severe pressure drop along the injection device such that the overall efficiency of the process can be maintained or improved.

For example, for gas turbine applications, the streamlined body has a height H along its longitudinal axis (perpendicular to the main flow) in the exemplary range of 100-200 mm. In particular under the circumstances, the lobe periodicity ("wavelength") $\lambda$ can be in the exemplary range of 20-100 mm, such as in the range of 30-60 mm. This means that along the trailing edge there are located six alternating lobes, three in each transverse direction.

According to yet another exemplary embodiment, at least two (e.g., at least three, more preferably at least four or five) fuel nozzles are located at the trailing edge and distributed (preferentially in equidistant manner) along the trailing edge.

According to yet another exemplary embodiment, the fuel nozzles are located essentially on the central plane of the streamlined body (so typically not in the lobed portions of the trailing edge). In this case, a fuel nozzle is preferably located at each position or every second position along the trailing edge, where the lobed trailing edge crosses the central plane.

According to yet another exemplary embodiment, the fuel nozzles are located essentially at the apexes of lobes, wherein preferably a fuel nozzle is located at each apex or every second apex along the trailing edge.

Such a burner can be bordered by burner sidewalls. For example, the sidewalls are essentially planar wall structures, which can be converging towards the exit side. For example, (but not only) those sidewalls which are essentially parallel to the main axis of the lobed injection device(s) can, in accordance with yet another preferred embodiment, also be lobed so they can have an undulated surface. This undulation can, even more preferably, be essentially the same characteristics as the one of the injectors (e.g., the undulation can be inverted to the undulation of neighboring streamlined bodies, and may be arranged out of phase with the undulations of the injector(s)). It may also have essentially the same height of the undulations as the height of the lobes of the injectors. So it is possible to have a structure, in which one lobed injector is bordered by at least one (e.g., two) lateral sidewalls of the combustion chamber, which have the same undulation characteristics, so that the flow path as a whole has the same lateral width as a function of the height. In other words the lateral distance between the sidewall and the trailing edge of the injector is essentially the same for all positions when going along the longitudinal axis of the injector.

For example, downstream of said body (e.g., downstream of a group of for example three of such bodies located within the same burner) a mixing zone is located, and at and/or downstream of said body the cross-section of said mixing zone is reduced, wherein for example, this reduction is at least 10%, more preferably at least 20%, even more preferably at least 30%, compared to the flow cross-section upstream of said body.

At least the nozzle injects fuel (liquid or gas) and/or carrier gas parallel to the main flow direction. At least one nozzle may however also inject fuel and/or carrier gas at an inclination angle of normally not more than 30° with respect to the main flow direction.

The streamlined body can extend across the entire flow cross section between opposite walls of the burner.

Further, the burner can be a burner comprising at least two (e.g., at least three) streamlined bodies the longitudinal axes of which are arranged essentially parallel to each other. In this case normally only the central streamlined body has its central plane arranged essentially parallel to the main flow direction, while the two outer streamlined bodies are slightly inclined converging towards the mixing zone. This in particular if the mixing zone have the same converging shape.

According to an exemplary embodiment, the body is provided with cooling elements, wherein these cooling elements can be given by internal circulation of cooling medium along the sidewalls of the body (e.g., by providing a double wall structure) and/or by film cooling holes, located, for example, near the trailing edge, and wherein the cooling elements can be fed with air from the carrier gas feed also used for the fuel injection.

For a gas turbine with sequential combustion, for example, the fuel is injected from the nozzle together with a carrier gas stream, and the carrier gas air is low pressure air with a pressure in the exemplary range of 10-25 bar, preferably in the range of 16-22 bar.

As mentioned above, the streamlined body can have a cross-sectional profile which, in the portion where it is not lobed, is mirror symmetric with respect to the central plane of the body for application with axial inflow.

The streamlined body can be arranged in the burner such that a straight line connecting the trailing edge to a leading edge extends parallel to the main flow direction of the burner.

A plurality of separate outlet orifices of a plurality of nozzles can be arranged next to one another and arranged at the trailing edge.

At least one slit-shaped outlet orifice can be, in the sense of a nozzle, arranged at the trailing edge. A split-shaped or elongated slot nozzle can be arranged to extend along the trailing edge of the streamlined body.

The nozzles can comprise multiple outlet orifices for different fuel types and carrier air. In an exemplary embodiment a first nozzle for injection of liquid fuel or gas fuel, and a second nozzle for injection of carrier air, which encloses the first nozzle, are arranged at the trailing edge.

In another exemplary embodiment a first nozzle for injection of liquid fuel, a second nozzle for injection of a gaseous fuel, which encloses the first nozzle, and a third nozzle for injection of carrier air, which encloses the first nozzle, and the second nozzle, are arranged at the trailing edge.

Besides an improved burner comprising the flow straightener and mixer, a method for operation of such a burner is disclosed. Depending on the operating conditions, and load point of a gas turbine, the fuel flow injected trough a burner varies in a wide range. A simple operation where the flow is equally distributed to all burner nozzles and the flow through each nozzle is proportional to the total flow can lead to very small flow velocities at individual nozzles impairing the injection quality and penetration depth of the fuel into the air flow.

According to an exemplary embodiment of the operating method the number of fuel injection nozzles trough which fuel is injected is determined as function of the total injected fuel flow in order to assure a minimum flow in the operative nozzles.

In another exemplary embodiment the fuel is injected through every second fuel nozzle of a vane at low fuel flow rates. Alternatively the fuel is only injected through the fuel nozzles of every second or third vane of the burner. Further, the combination of both methods to reduce fuel injection is suggested: For low fuel mass flows the fuel is injected trough every second or third fuel nozzle of a vane and only through the fuel nozzles of every second or third vane of the burner is proposed. At an increased mass flow the number of vanes used for fuel injection and then the number of nozzles used for fuel injection per vane can be increased. Alternatively, at an increased mass flow the number of nozzles used for fuel injection per vane can be increased and then the number of vanes used for fuel injection and can be increased. Activation and deactivation of nozzles can for example be determined based on corresponding threshold fuel flows.

Furthermore the present disclosure relates to the use of a burner as described herein for the combustion under high reactivity conditions, such as for the combustion at high burner inlet temperatures and/or for the combustion of MBtu fuel, normally with an exemplary calorific value of 5000-20,000 kJ/kg, preferably 7000-17,000 kJ/kg, more preferably 10,000-15,000 kJ/kg, most preferably such a fuel comprising hydrogen gas.

Referring to a first use of a flow straightener and mixing device for at least one burner for a combustion chamber the gas turbine group includes (e.g., consists of) as an autonomous unit, a compressor, a first combustion chamber connected downstream of the compressor, a first turbine connected downstream of this combustion chamber, a second combustion chamber connected downstream of this turbine and a second turbine connected downstream of this combustion chamber. The turbomachines, namely compressor, first and second turbines, can have a single rotor shaft, supported by at least two bearings. The first combustion chamber, which is configured as a self-contained annular combustion chamber, is accommodated in a casing. At its front end, the annular combustion chamber has a number of burners distributed on the periphery and these maintain the generation of hot gas. The hot gases from this annular combustion chamber act on the first turbine immediately downstream, whose thermally expanding effect on the hot gases is deliberately kept to a minimum (e.g., this turbine will consequently include (e.g., consist of) not more than two rows of rotor blades). The hot gases which are partially expanded in the first turbine and which flow directly into the second combustion chamber have, for reasons presented, a very high temperature and the layout is preferably specific to the operation in such a way that the temperature will still be reliably around, for example, 900°-1000° C. This second combustion chamber has no pilot burners or ignition devices. The combustion of fuel blown into the exhaust gases coming from the first turbine takes place here by means of self-ignition provided. In order to ensure a such self-ignition of a natural gas in the second combustion chamber, the outlet temperature of the gases from the first turbine must consequently still be very high, as presented above, and this must of course also be so during part-load operation. In order to ensure operational reliability and high efficiency in a combustion chamber designed for self-ignition it is eminently important for the location of the flame front to remain stable.

Referring to a second use of a flow straightener and mixing device for at least one burner for a combustion chamber the gas turbine group consists, as an autonomous unit, of at least one compressor, at least one combustion chamber located downstream of the compressor, at least one turbine located downstream of the combustion chamber. The turbomachines, namely compressor and turbines, have preferably a single rotor shaft, and it is supported by at least two bearings. The combustion chamber comprising at least one combustion zone defines preferably an annular concept.

Referring to third use of a flow straightener and mixing device for at least one burner for a combustion chamber of a gas turbine group, wherein the gas turbine group comprises at least one compressor, a plurality of cylindrical or quasi-cylindrical combustors arranged in an annular or quasi-annular array on a common rotor, and at least one turbine, wherein the combustor comprises at least a primary and secondary combustion zones. At the front end the primary combustion zone has a number of burners distributed on the periphery and these maintain the generation of hot gas. A quench zone, positioned downstream of the primary combustion zone, comprises for example a cooling air and/or a fuel ports, or a catalytic section, or a heat transfer arrangement. In this case the hot gases which are partially cooled in the quench zone and which flow directly into the second combustion zone have a very high temperature and the layout is for example, specific to the operation in such a way that the temperature will still be reliably around, for example, 900°-1000° C. This second combustion zone has no pilot burners or ignition devices. The combustion of fuel blown into the exhaust gases coming from the quench zone takes place here by means of self-ignition provided.

A lobed mixing concept is described with reference to FIG. 1. FIG. 1 shows exemplary flow conditions along a streamlined body. The central plane 35 of which is arranged essentially parallel to a flow direction 14 of an airflow, which has a straight leading edge 38 and a lobed trailing edge 39. The airflow 14 at the leading edge in a situation like that develops a flow profile as indicated schematically in the upper view with the arrows 14.

The lobed structure 42 at the trailing edge 39 is progressively developing downstream the leading edge 38 to a wavy shape with lobes going into a first direction 30, which is transverse to the central plane 35, the lobe extending in that first direction 30 is designated with the reference numeral 28. Lobes extending into a second transverse direction 31, so in FIG. 1*a* in a downward direction, are designating with reference numeral 29. The lobes alternate in the two directions and wherever the lobes or rather the line/plane forming the trailing edge pass the central plane 35 there is a turning point 27.

As one can see from the arrows indicated in FIG. 1*a*, the airflow flowing in the channel-like structures on the upper face and the airflows in the channels on the lower face intermingle and start to generate vortexes downstream of the trailing edge 39 leading to an intensive mixing as indicated with reference numeral 41. Theses vortices 41 are useable for the injection of fuels/air as will be discussed further below.

The lobed structure 42 can be defined by the following parameters:

- the periodicity λ gives the width of one period of lobes in a direction perpendicular to the main flow direction 14;
- the height h is the distance in a direction perpendicular to the main flow direction 14, so along the directions 30 and 31, between adjacent apexes of adjacent lobes as defined in FIG. 1*b*.
- the first lobe angle $\alpha_1$ (also called elevation angle) which defines the displacement into the first direction of the lobe 28, and the second lobe angle $\alpha_2$ (also called elevation angle), which defines the displacement of lobe 29 in the direction 31. For example, $\alpha_1$ is identical to $\alpha_2$.

Figure 2:
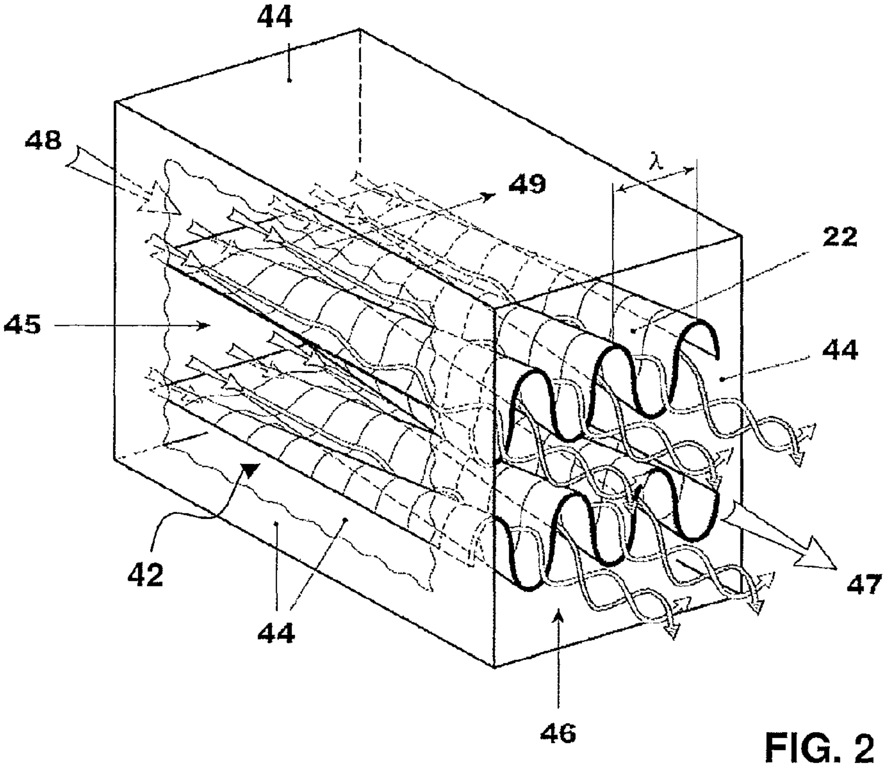
FIG. 2 shows an exemplary flow straightener and mixer comprising lobed streamlined bodies where lobes on neighboring streamlined bodies are arranged out of phase.

FIG. 2 shows a perspective view of a flow straightener and mixer 43 comprising two streamlined bodies 22 with lobes 28, 29 on the trailing edges, which are arranged inside a structure comprising 4 limiting walls 44, which form a rectangular, flow path with an inlet area 45 and an outlet area 46. The lobes 28, 29 on the streamlined bodies 22 have essentially the same periodicity λ but out of phase (e.g., the number of lobes at the trailing edge of each streamlined body 22 is identical and the lobes on neighboring streamlined bodies 22 are arranged in out of phase). For example, the phases are shifted by 180° (e.g., the lobes of both streamlined bodies 22 cross the center line at the same position in longitudinal direction, and at the same position in longitudinal direction the deflection of each body has the same absolute value but is in opposite direction).

The flow path through the flow straightener and mixer 43 is parallel to the limiting walls 44 and guiding the flow in a direction practically parallel to the longitudinal axis 47 of the flow straightener and mixer 43. The streamlined bodies 22 have a longitudinal axis 49, which are arranged normal to the longitudinal axis 47 of the flow straightener and mixer 23 and normal to the inlet flow direction 48, which in this example is parallel to the longitudinal axis 47. To assure good mixing a flow field with turbulent dissipation can be induced over the complete cross section of the flow path by arranging two or more streamlined bodies 22 in the flow path.

Lobes, which are arranged out of phase can lead to a further improved mixing as is discussed in more detail with reference to FIG. 4.

Figure 3A:
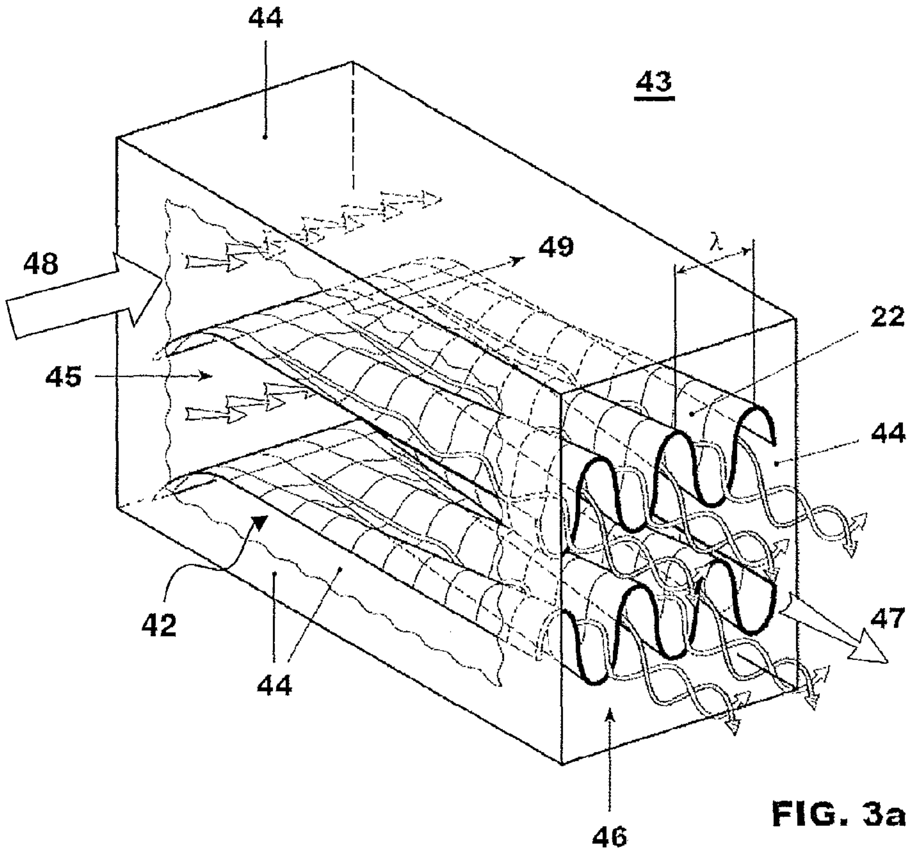
FIG. 3 shows in *a*) a schematic perspective view of an exemplary flow straightener and mixer comprising lobed streamlined bodies where lobes on neighboring streamlined bodies are arranged out of phase and configured to redirect the main flow and in *b*) a side view of the flow straightener and mixer.

FIG. 3*a* shows a perspective view of a flow straightener and mixer 43 comprising two streamlined bodies 22 with lobes on the trailing edges, which are arranged inside a structure comprising 4 limiting walls 44, which form a rectangular flow path with an inlet area 45 and an outlet area 46. As in FIG. 2, in FIG. 3 the lobes on the streamlined bodies 22 are arranged out of phase, for example, the phases are shifted by 180° (e.g., lobes of both streamlined bodies cross the center line at the same position in longitudinal direction, and at the same position in longitudinal direction the deflection the deflection of each body has the same absolute value but is in opposite direction).

The streamlined bodies 22 are configured to redirect the main flow, which enters the flow straightener and mixer 43 under an inlet angle in the inlet flow direction 48 to a flow direction, which is substantially parallel to the longitudinal axis 47 of the flow straightener and mixer 23, therefore effectively turning the main flow by the inlet angle β.

Figure 3B:
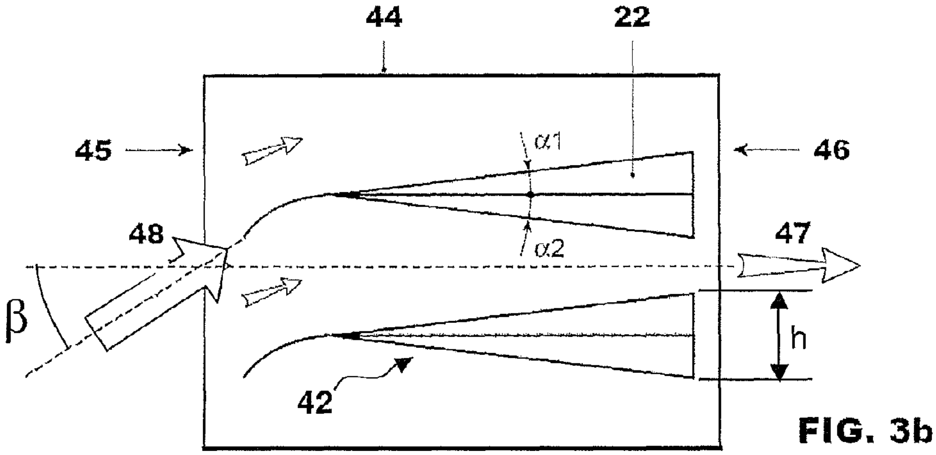

A side view of the flow straightener and mixer 43 comprising two streamlined bodies 22 with lobes on the trailing edges is shown in FIG. 3*b*. In the examples shown the lobes extend with a constant lobe angle $\alpha_1$, $\alpha_2$ in axial direction. In other embodiments the lobes start practically parallel to the main flow direction and the lobe angle $\alpha_1$, $\alpha_2$ is gradually increasing in flow direction.

Further, FIG. 3*b* shows the inlet angle β, by which the main flow is turned in the flow straightener and mixer 43. To turn the main flow the streamlined bodies 22 are inclined in the direction of the inlet flow 48 and under an angle to the longitudinal axis 47 at the inlet region and are turned in a direction substantially parallel to the longitudinal axis 47 at the outlet region of the flow straightener and mixer 43.

Figure 4:
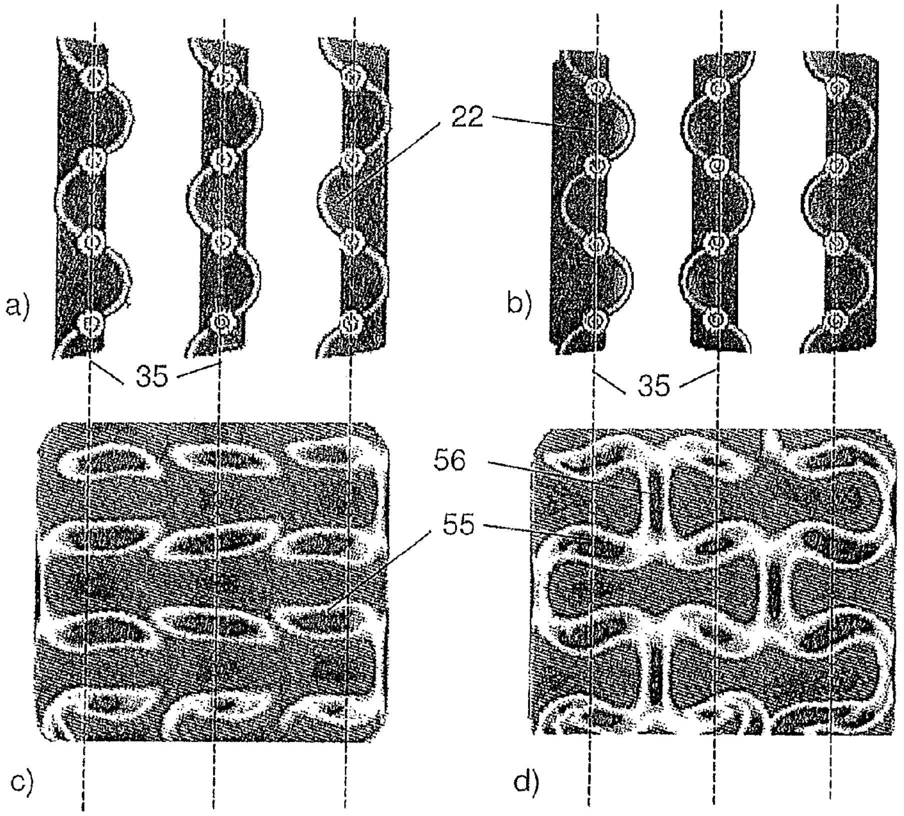
FIG. 4 shows in *a*) exemplary streamlined bodies of a flow straightener and mixer from a downstream end with lobes on neighboring streamlined bodies arranged in phase with each other, and in *b*) out of phase as well as the resulting pattern of turbulent dissipation in *c*) and *d*)

In FIG. 4 streamlined bodies 22 of a flow straightener and mixer are shown from a downstream end. FIG. 4 *a*) shows an arrangement with lobes on neighboring streamlined bodies 22 arranged in phase with each other, and FIG. 4 *b*) shows an arrangement with lobes on neighboring streamlined bodies 22 out of phase as. Further, the resulting pattern of turbulent dissipation is shown in FIGS. 4 *c*) and *d*).

In FIG. 4 *c*) the resulting pattern of turbulent dissipation for the arrangement of FIG. 4*a* with lobes on neighboring streamlined bodies 22 arranged in phase with each other is shown. As a result of the lobes, which have deflections in phase from the central planes 35 of all streamlined bodies 22, turbulent vortex dissipation is created in a planes essentially normal to central planes 35, which are most pronounced at the location of maximum deflection. With this arrangement a homogeneous mixture can be obtained if mixing is mainly required in one direction.

FIG. 4 *d*) shows the resulting pattern of turbulent dissipation for the further improved arrangement of FIG. 4 *b*) with lobes on neighboring streamlined bodies 22 arranged out of phase. As a result of the lobes, which have deflections out of phase, turbulent vortex dissipation is created in a planes essentially normal to central planes 35, which are most pronounced at the location of maximum deflection. Additionally zones of high, turbulent vortex dissipation are generated parallel to central planes 35 of streamlined bodies 22 in the region between two neighboring streamlined bodies 22 and between streamlined bodies 22 and limiting sidewalls. Due to the turbulent vortex dissipation in two directions, it is assured that a homogeneous mixture can be obtained for all possible inlet conditions.

Homogeneous mixing of fuel and combustion air with minimum pressure drop are preconditions for the design of highly efficient modern gas turbines. Homogeneous mixing can be used to avoid local maxima in the flame temperature, which can lead to high NOx emissions. Low pressure drops can be advantageous because the pressure drop in the combustor is directly impairing power and efficiency of a gas turbine.

A gas turbine burner comprising the disclosed flow straightener and mixer 43 enables homogeneous mixing with low pressure drop.

Exemplary advantages of this kind of burner can be big for burners, which burn high reactivity fuels and for burners with high combustor inlet temperatures such as Sequential EnVironmental burner (SEV).

Therefore on the example of SEV burners several design modifications to the existing SEV designs are proposed to introduce a low pressure drop complemented by rapid mixing for highly reactive fuels and operating conditions. This disclosure can accomplish fuel-air mixing within short burner-mixing lengths. The concept can include aerodynamically facilitated axial fuel injection with mixing promoted by small sized vortex generators. Further performance benefit is achieved with elimination/replacement of high-pressure and more valuable carrier air with lower pressure carrier air. As a result, the burner is designed to operate at an increased SEV inlet temperature or fuel flexibility without suffering on high NOx emissions or flashback.

Exemplary advantages can be summarized as follows:

Higher burner velocities to accommodate highly reactive fuels

Lower burner pressure drop for similar mixing levels achieved with current designs SEV operable at higher inlet temperatures Possibility to remove or replace high-pressure carrier air with lower pressure carrier air With respect to performing a reasonable fuel air mixing, the following components of current burner systems are of interest:

At the entrance of the SEV combustor, the main flow must be conditioned in order to guarantee uniform inflow conditions independent of the upstream disturbances, e.g. caused by the high-pressure turbine stage.

Then, the flow must pass four vortex generators.

For the injection of gaseous and liquid fuels into the vortices, fuel lances are used, which extend into the mixing section of the burner and inject the fuel(s) into the vortices of the air flowing around the fuel lance.

Figure 5:
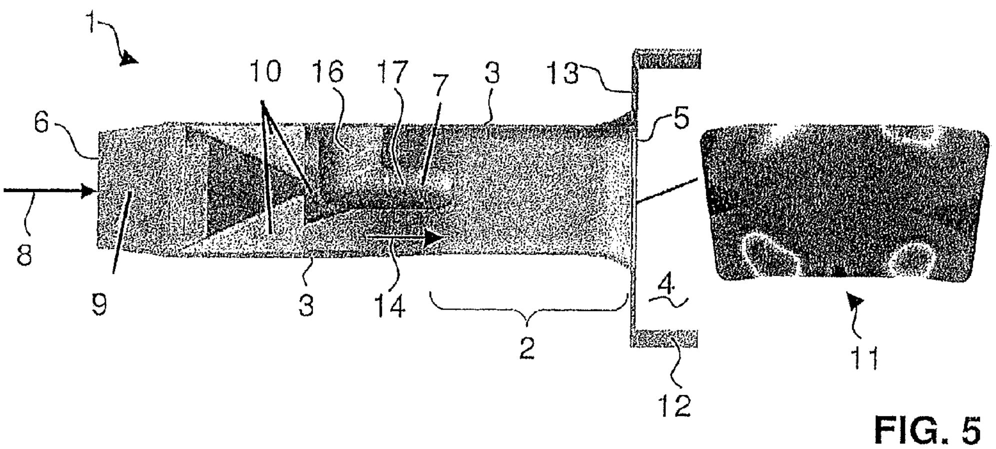
FIG. 5 shows an exemplary secondary burner located downstream of the high-pressure turbine together with the fuel mass fraction contour (right side) at the exit of the burner.

To this end FIG. 5 shows a known secondary burner 1. The burner, which is an annular burner, is bordered by opposite walls 3. These opposite walls 3 define the flow space for the flow 14 of oxidizing medium. This flow enters as a main flow 8 from the high pressure turbine, i.e. behind the last row of rotating blades of the high pressure turbine, which is located downstream of the first combustor. This main flow 8 enters the burner at the inlet side 6. First this main flow 8 passes flow-conditioning elements 9, can be typically stationary turbine outlet guide vanes, which bring the flow into the proper orientation. Downstream of these flow conditioning elements 9 vortex generators 10 are located in order to prepare for the subsequent mixing step. Downstream of the vortex generators 10 there is provided an injection device or fuel lance 7, which can comprise a stem or foot 16 and an axial shaft 17. At the most downstream portion of the shaft 17 fuel injection takes place, in this case fuel injection takes place via orifices, which inject the fuel in a direction perpendicular to flow direction 14 (cross flow injection).

Downstream of the fuel lance 7 there is the mixing zone 2, in which the air, bordered by the two walls 3, mixes with the fuel and then at the outlet side 5 exits into the combustion chamber or combustion space 4 where self-ignition takes place.

At the transition between the mixing zone 2 to the combustion space 4 there can be a transition 13, which may be in the form of a step, or as indicated here, may be provided with round edges and also with stall elements for the flow. The combustion space is bordered by the combustion chamber wall 12.

This leads to a fuel mass fraction contour 11 at the burner exit 5 as indicated on the right side of FIG. 5.

Figure 6:
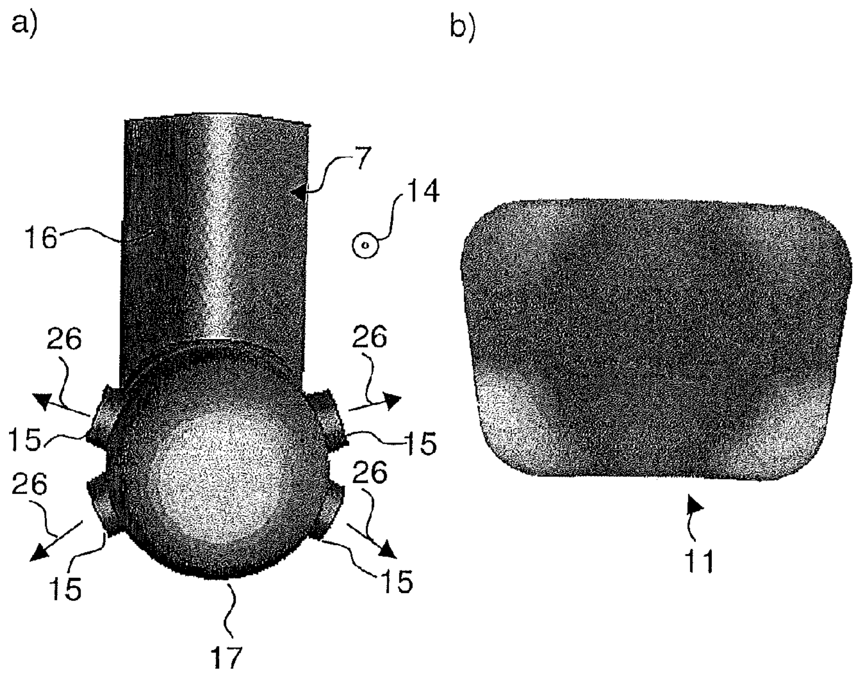
FIG. 6 shows an exemplary secondary burner fuel lance in a view opposite to the direction of the flow of oxidizing medium in *a*) and the fuel mass fraction contour using such a fuel lance at the exit of the burner in *b*)

In FIG. 6 a second fuel injection is illustrated, here the fuel lance 7 is not provided with conventional injection orifices but in addition to their positioning at specific axial and circumferential positions has circular sleeves protruding from the cylindrical outer surface of the shaft 17 such that the injection of the fuel along injection direction 26 is more efficient as the fuel is more efficiently directed into the vortices generated by the vortex generators 10.

Using a set-up according to FIG. 6*a*, the fuel mass fraction contour according to FIG. 6*b* results.

SEV-burners are currently designed for operation on natural gas and oil. Therefore, the momentum of the fuel is adjusted relative to the momentum of the main flow so as to penetrate in to the vortices. The subsequent mixing of the fuel and the oxidizer at the exit of the mixing zone is just sufficient to allow low NOx emissions (mixing quality) and avoid flashback (residence time), which may be caused by auto ignition of the fuel air mixture in the mixing zone.

The present disclosure relates to burning of fuel air mixtures with a low ignition delay time. This can be achieved by an integrated approach, which allows higher velocities of the main flow and in turn, a lower residence time of the fuel air mixture in the mixing zone. The challenge regarding the fuel injection is twofold with respect to the use of hydrogen rich fuels and fuel air mixtures with high temperatures:

Hydrogen rich fuels may change the penetration behavior of the fuel jets. The penetration is determined by the cross section areas of the burner and the fuel injection holes, respectively.

Depending on the type of fuel or the temperature of the fuel air mixture, the reactivity, which can be defined as $t_{ign,ref}/t_{ign}$, i.e. as the ratio of the ignition time of reference natural gas to the actual ignition time of the fuel air mixture changes.

Conditions which can be addressed such as those where the reactivity as defined above is above 1 and the flames are auto igniting. The invention is however not limited to these conditions.

For each temperature and mixture composition the laminar flame speed and the ignition delay time change. As a result, hardware configurations must be provided offering a suitable operation window. For each hardware configuration, the upper limit regarding the fuel air reactivity is given by the flashback margin.

In the framework of an SEV burner the flashback risk is increased, as the residence time in the mixing zone exceeds the ignition delay time of the fuel air. Mitigation can be achieved in several different ways:

The inclination angle of the fuel can be adjusted to decrease the residence time of the fuel. Herein, various possibilities regarding the design may be considered, e.g. inline fuel injection, such as essentially parallel to the oxidizing airflow, a conical lance shape or a horny lance design.

The reactivity can be slowed down by diluting the fuel air mixture with nitrogen or steam, respectively.

De-rating of the first stage can lead to less aggressive inlet conditions for the SEV burner in case of highly reactive fuels. In turn, the efficiency of the overall gas turbine may decrease.

The length of the mixing zone can be kept constant, if in turn the main flow velocity is increased. However, then a penalty on the pressure drop may be taken.

By implementing more rapid mixing of the fuel and the oxidizer, the length of the mixing zone can be reduced while maintaining the main flow velocity.

A improved burner configuration is disclosed, wherein the latter two points are addressed, which however can be combined also with the upper three points.

In order to allow capability for highly reactive fuels, the injector can be designed to perform:

flow conditioning (at least partial), injection and mixing simultaneously. As a result, the injector can save burner pressure loss, which is currently utilized in the various devices along the flow path. If the combination of flow conditioning device, vortex generator and injector is replaced by the proposed invention, the velocity of the main flow can be increased in order to achieve a short residence time of the fuel air mixture in the mixing zone.

Figure 7:
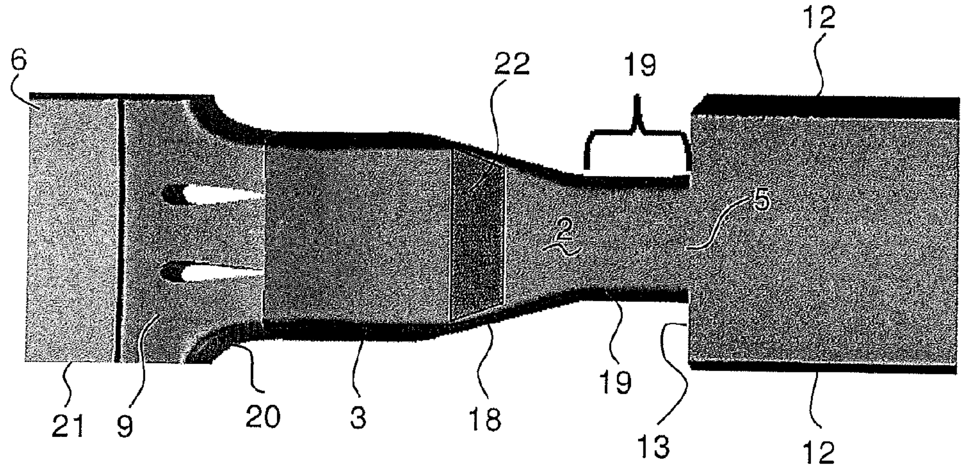
FIG. 7 shows an exemplary secondary burner located downstream of the high-pressure turbine with reduced exit cross-section area.

FIG. 7 shows a set-up, where the proposed burner area is reduced considerably. The higher burner velocities help in operating the burner safely at highly reactive conditions. FIG. 7, a proposed burner is shown with reduced exit cross-section area. In this case downstream of the inlet side 6 of the burner there is located a flow conditioning element or a row of flow conditioning elements 9 but in this case not followed by vortex generators but then directly followed with a fuel injection device according to the invention, which is given as a streamlined body 22 extending with its longitudinal direction across the two opposite walls 3 of the burner. At the position where the streamlined body 22 is located the two walls 3 converge in a converging portion 18 and narrow down to a reduced burner cross-sectional area 19. This defines the mixing space 2, which ends at the outlet side 5 where the mixture of fuel and air enters the combustion chamber or combustion space 4, which is delimited by walls 12.

This general concept of lobed mixers as described for FIG. 1 is now applied to flute like injectors for a burner.

Figure 8:
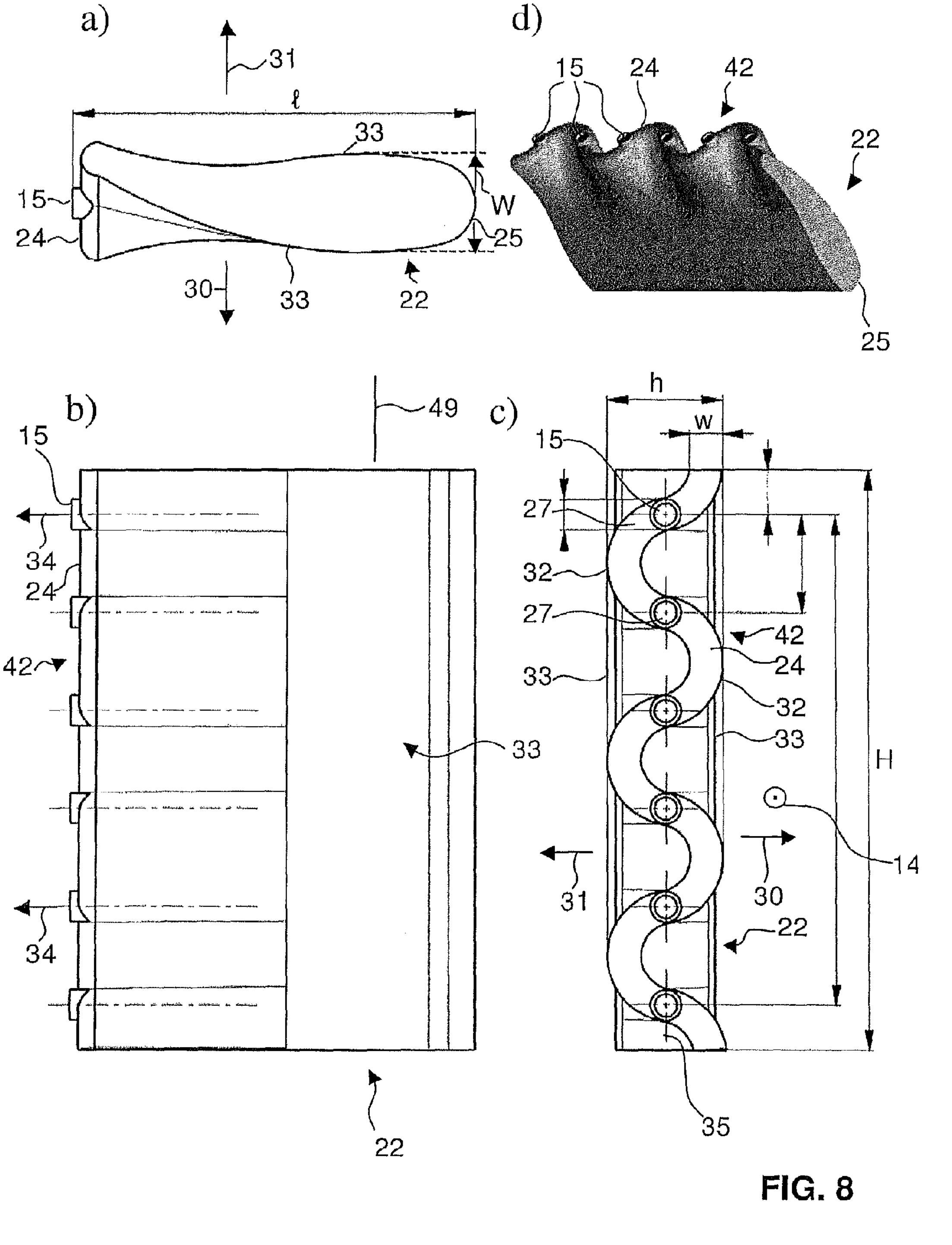
FIG. 8 shows an exemplary lobed flute, wherein in *a*) a cut perpendicular to the longitudinal axis is shown, in *b*) a side view, in *c*) a view onto the trailing edge and against the main flow, and in *d*) a perspective view is shown.

FIG. 8 shows the basic design resulting in a flute like injector. The injector can be part of a burner, as already described elsewhere. The main flow is passing the lobed mixer, resulting in velocity gradients. These result in intense generation of shear layers, into which fuel can be injected. The lobe angles are chosen in such way to avoid flow separation.

More specifically, the streamlined body 22 is configured as flute 22, which is illustrated in a cut in FIG. 8*a*, in side view in FIG. 8*b*, in a view onto the trailing edge against the main flow direction 14 in 5*c* and in a perspective view in FIG. 8*d*.

The streamlined body 22 has a leading edge 25 and a trailing edge 24. The leading edge 25 defines a straight line and in the leading edge portion of the shape the shape is essentially symmetric, so in the upstream portion the body has a rounded leading edge and no lobing. The leading edge 25 extends along the longitudinal axis 49 of the flute 22. Downstream of this upstream section the lobes successively and smoothly develop and grow as one goes further downstream towards the trailing edge 24. In this case the lobes are given as half circles sequentially arranged one next to the other alternating in the two opposite directions along the trailing edge, as particularly easily visible in FIG. 8*c*.

At each turning point 27 which is also located on the central plane 35, there is located a fuel nozzle which injects the fuel inline, so essentially along the main flow direction 14. In this case the trailing edge is not a sharp edge but has width W, which is for example in the range of 5 to 10 mm. The maximum width W of the flute element 22 is in the range of 25-35 mm and the total height h of the lobing is only slightly larger than this width W.

A streamlined body for an exemplary burner in this case has a height H in the range of 100-200 mm. The periodicity $\lambda$ is around 40-60 mm.

Figure 9C:
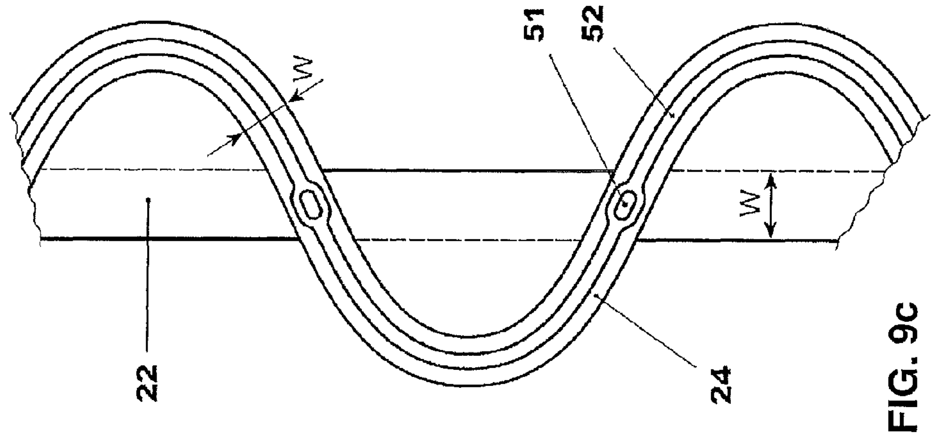
FIG. 9 shows views against the main flow onto the trailing edge of exemplary lobed flutes with different nozzle arrangements.
Figure 9B:
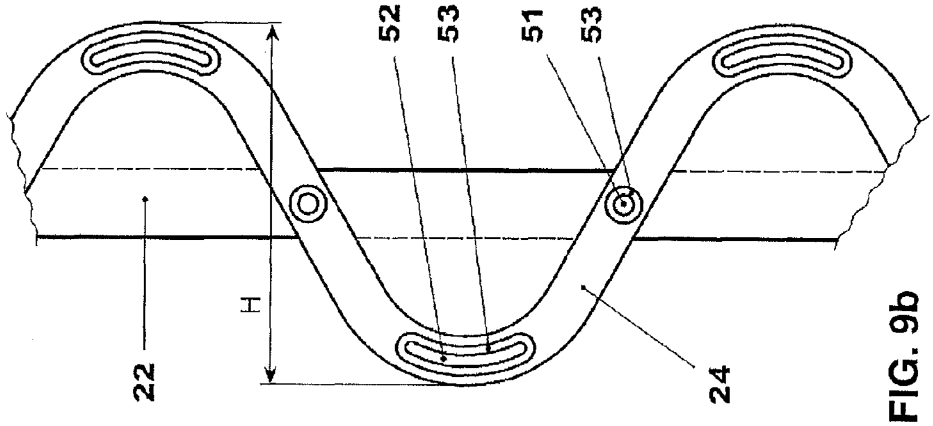
Figure 9A:
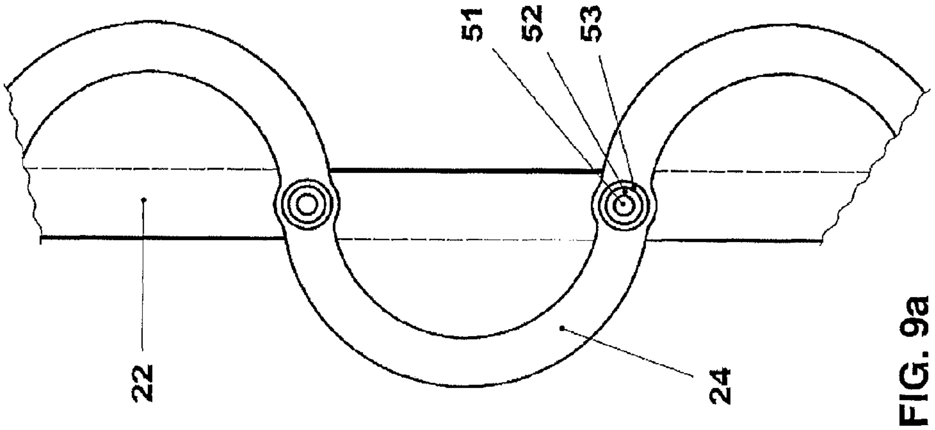

FIG. 9 shows views against the main flow onto the trailing edge of lobed flutes 22 with different nozzle arrangements. FIG. 9*a* shows an arrangement where first nozzles 51 for injection of liquid fuel, are enclosed by second nozzles 52 for injection of a gaseous fuel, which themselves are encloses by third nozzles 53 for injection of carrier air. The nozzles 51, 52, 53 are arranged concentrically at the trailing edge. Each nozzle arrangement is located where the lobed trailing edge crosses the center plane 35.

FIG. 9*b* shows an arrangement where second nozzles 52 for fuel gas injection are configured as a slit-like nozzle extending along the trailing edge each at each apex section of the lobes. Additionally first nozzles 51 for liquid fuel injection arranged at each location where the lobed trailing edge crosses the center plane 35. All the first and second nozzles 51, 52 are enclosed by third nozzles 53 for the injection of carrier air.

FIG. 9*c* shows an arrangement where a second nozzle 52 for fuel gas injection is configured as one slit-like nozzle extending along at least one lobe along the trailing edge. For liquid fuel injection additional first nozzles 51 in the form of orifices are arranged in the second nozzles 52.

Figure 10:
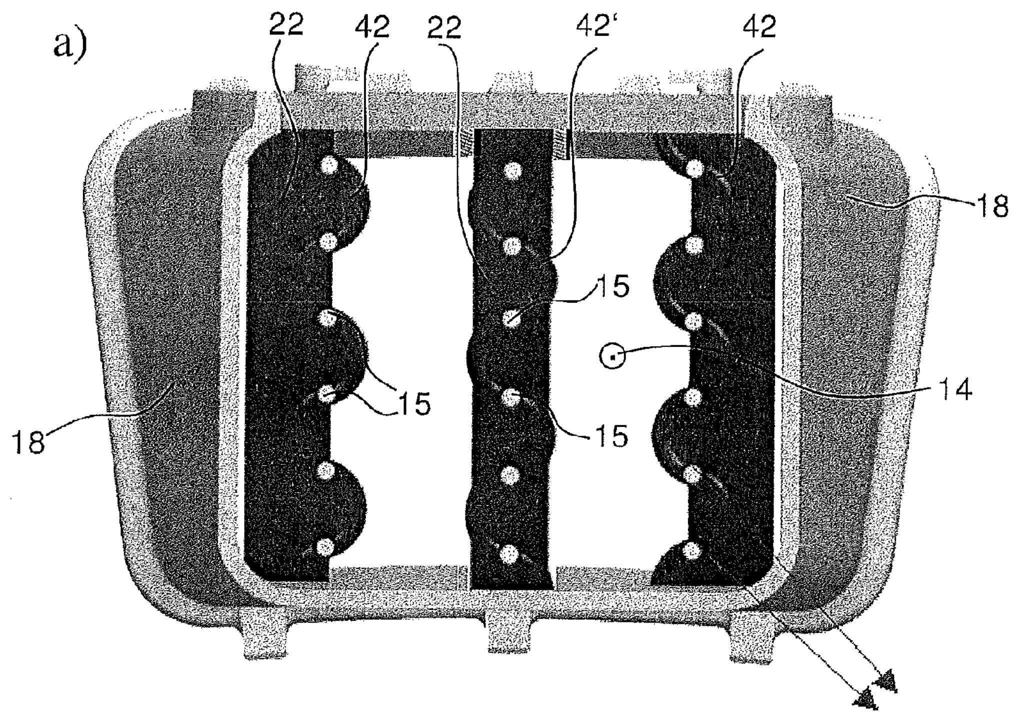
FIG. 10 shows a view against the main flow direction.

FIG. 10 shows the lobed flute housed inside a reduced cross sectional area burner. The lobes are staggered in order to improve the mixing performance. The lobe sizes can be varied to optimize both pressure drop and mixing.

In FIG. 10 a view against the main flow direction 14 in the burner into the chamber where there is the converging portion 18 is shown. Three bodies in the form of lobed injectors 22 are arranged in this cavity and the central body 22 is arranged essentially parallel to the main flow direction, while the two lateral bodies 22 are arranged in a converging manner adapted to the convergence of the two side walls 18.

Top and bottom wall in this case are arranged essentially parallel to each other, they may however also converge towards the mixing section.

In the case of FIG. 10 the lobing of the trailing edge is essentially similar to the one as illustrated in FIG. 8.

Depending on the desired mixing properties, the height of the lobbing can be adapted (also along the trailing edge of one flute the height may vary).

Figure 11:
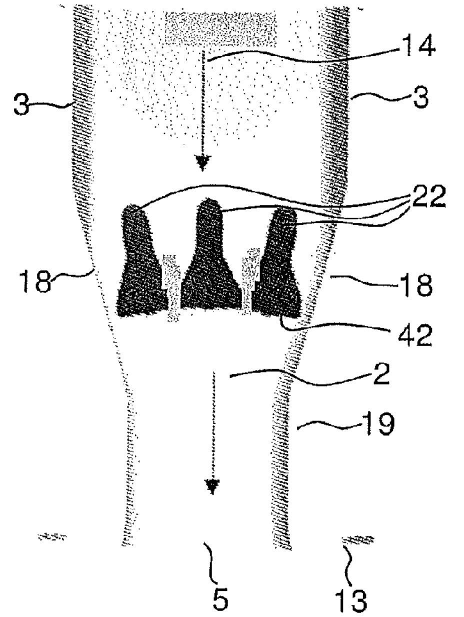
FIG. 11 shows an exemplary burner, in a top view with removed top cover.

In FIG. 11 a burner similar to the one illustrated in FIG. 10 is given in a top view with the cover wall removed. The lateral two bodies 22 are arranged in a converging manner so that the flow is smoothly converging into the reduced cross sectional area towards the mixing space 2 bordered by the side wall at the reduced burner cross sectional area 19. Further the lobe height h of streamlined body 22 is bigger than in the example of FIG. 10. The flame can be located at the exit of this area 19, so at the outlet side 5 of the burner.

Modern gas turbines can have annular combustors. To realize an annular combustor a number of burners with a rectangular cross section as for example shown in FIGS. 5, 7, 10 and 11 can be arranged concentrically around the axis of a gas turbine. For example, they are equally distanced and form a ring like structure. A trapezoidal cross-section or cross section in the form of ring segments can also be used.

Figure 12:
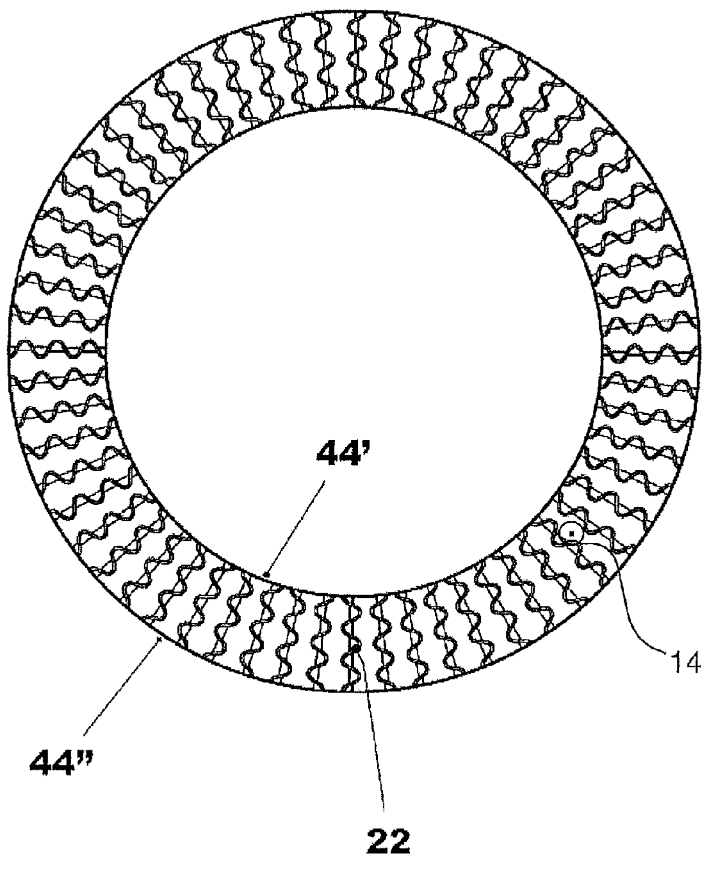
FIG. 12 shows a view against the main flow direction of an annular burner with lobed flutes radially arranged between an inner and outer wall of the burner.

In an exemplary embodiment an annular burner as shown in FIG. 12 is proposed. FIG. 12 shows an annular burner comprising streamlined bodies 22 with lobed trailing edges 24, which are radially arranged between an inner wall 44' and outer wall 44" in a view against the main flow direction. The lobes 42 of neighboring streamlined bodies 22 are arranged out of phase. For example, the number of streamlined bodies 22 is even to allow an alternating orientation of lobes of all neighboring streamlined elements, when closing the circle.

The inner wall 44' and outer wall 44" form an annular flow path. When in operation the streamlined bodies 22 with lobed trailing edges 22 impose a turbulent dissipating flow field on the gases, with two main orientations of turbulent dissipation fields: one in radial direction, practically parallel to the streamlined bodies, 22 and in each case between two streamlined body 22, and one normal to the streamlined body 22 in circumferential direction concentric with the inner and outer walls 44 (not shown). In the example at least every second stream lined body 22 is provided with fuel nozzles 15 to form lobed flutes 22. The resulting three-dimensional flow field assures a good mixing and creates a homogeneous fuel air mixture in a very short distance and time.

Several embodiments to the lobed fuel injection system are listed below:

Embodiment 1

Staggering of lobes to eliminate vortex-vortex interactions. The vortex-vortex interactions result in not effectively mixing the fuel air streams.

Embodiment 2

Careful placement and location of fuel injection on the lobes: Fuel jets can be placed in the areas of high shear regions in order to best utilize the turbulent dissipation for mixing.

Embodiment 3

Inclined fuel injection in the lobes: This allows fuel to be injected in to the vortex cores.

Embodiment 4

NUMBER of flute lobes inside the burner: The flutes can be varied to decide on the strength of the vortices.

Embodiment 5

Fuel staging in the lobed fuel injectors to control emissions and pulsations.

Exemplary advantages of lobed injectors when compared to existing concepts can be summarized as follows:

- Better streamlining of hot gas flows to produce strong vortices for rapid mixing and low-pressure drops.
- The high speed shearing of fuel mixture can be utilized to control combustor pulsations and flame characteristics.
- The lobed flute injector is flexible offering several design variations.
- Rapid shear of fuel and air due to lobed structures results in enhanced mixing delivered with shorter burner mixing lengths.

The work leading to the exemplary disclosure herein has received funding from the [European Community's] Seventh Framework Programme ([FP7/2007-2013) under grant agreement n° [211971].

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE SIGNS

| | |
|---|---|
| 1 | burner |
| 2 | mixing space, mixing zone |
| 3 | burner wall |
| 4 | combustion space |
| 5 | outlet side, burner exit |
| 6 | inlet side |
| 7 | injection device, fuel lance |
| 8 | main flow from high-pressure turbine |
| 9 | flow conditioning, turbine outlet guide vanes |
| 10 | vortex generators |
| 11 | fuel mass fraction contour at burner exit 5 |
| 12 | combustion chamber wall |
| 13 | transition between 3 and 12 |
| 14 | flow of oxidizing medium |
| 15 | fuel nozzle |
| 16 | foot of 7 |
| 17 | shaft of 7 |
| 18 | converging portion of 3 |
| 19 | reduced burner cross-sectional area |
| 20 | reduction in cross section |
| 21 | entrance section of 3 |
| 22 | streamlined body, flute |
| 23 | lobed blade |
| 24 | trailing edge of 22, 23 |
| 25 | leading edge of 22, 23 |
| 26 | injection direction |
| 27 | turning point |
| 28 | lobe in first direction 30 |
| 29 | lobe in second direction 31 |
| 30 | first transverse direction |
| 31 | second transverse direction |
| 32 | apex of 28, 29 |
| 33 | lateral surface of 22 |
| 34 | ejection direction of fuel/carrier gas mixture |
| 35 | central plane of 22/23 |
| 38 | leading edge of 24 |
| 39 | trailing edge of 23 |
| 40 | flow profile |
| 41 | vortex |
| 42 | lobes |
| 43 | flow straightener and mixer |
| 44 | limiting walls |
| 44' | inner limiting wall |
| 44'' | outer limiting wall |
| 45 | inlet area |
| 46 | outlet area |
| 47 | longitudinal axis of 43 |
| 48 | inlet flow direction |
| 49 | longitudinal axis of 22 |
| 50 | central element |
| 51 | first nozzle |
| 52 | second nozzle |
| 53 | third nozzle |
| 54 | slot nozzle |
| 55 | normal turbulent dissipation |
| 56 | parallel turbulent dissipation |
| $\lambda$ | periodicity of 42 |
| h | height of 42 |
| $\alpha_1$ | first lobe angle |
| $\alpha_2$ | second lobe angle |
| $\beta$ | inlet angle |
| l | length of 22 |
| H | height of 22 |
| w | width at trailing edge |
| W | maximum width of 22 |

The invention claimed is:

1. Flow straightener and mixing device comprising:

a structure with walls having a longitudinal axis;

an inlet area;

an outlet area in a main flow direction; and at least two streamlined bodies, which are arranged in the flow straightener and mixing device, each having a streamlined cross-sectional profile, which extends with a longitudinal direction perpendicularly or at an inclination to the main flow direction of the flow straightener and mixing device, wherein a leading edge area of each streamlined body has a profile, which is oriented parallel to the main flow direction at a leading edge position, and wherein, with reference to a central plane of the streamlined bodies, the trailing edges are provided with at least two lobes in opposite transverse directions, wherein a transverse deflection from the central plane of two adjacent streamlined bodies, which form the lobes, are inverted, and wherein a transition from a planar leading edge region to the deflection is smooth with a surface curvature representing a function with a continuous first derivative, and at least one of the lobes of the streamlined bodies is configured as an injection device with at least one nozzle for introducing at least one fuel into a burner.

2. Flow straightener and mixing device according to claim 1, wherein the leading edge region of the streamlined body has an aerodynamic profile, which turns from an inclined orientation relative to the longitudinal axis of the flow straightener and mixing devices to an orientation, which is parallel to the longitudinal axis of the flow straightener and mixing device in an upstream half of the streamlined body.

3. Flow straightener and mixing device according to claim 1, wherein a transverse displacement of the streamlined body forming the lobes is only at most in a downstream two thirds of a length of the streamlined body.

4. Flow straightener and mixing device according to claim 1, wherein a distance between central planes of two streamlined bodies is at least 1.2 times the height (h) of the lobes.

5. Flow straightener and mixing device according to claim 1, comprising:

a rectangular or trapezoidal cross section extending along the longitudinal axis, which is defined by four walls, with the at least two streamlined bodies extending from one wall to an opposing wall.

6. Flow straightener and mixing device according to claim 1, comprising:

an annular cross section extending along the longitudinal axis with an inner wall and an outer wall, which are concentric to each other, and with the at least two streamlined bodies extending from the inner wall to the outer wall.

7. A flow straightener and mixing device according to claim 1, wherein at least one fuel nozzle is located at the trailing edge of at least one of the streamlined bodies.

8. A flow straightener and mixing device according to claim 7, comprising:

at least two fuel nozzles located at the trailing edge of at least one of the streamlined bodies located essentially at apexes of the lobes, wherein at each apex or at every second apex along the trailing edge there is located a fuel nozzle, and/or wherein a fuel nozzle is located essentially on the central plane of the streamlined body, wherein at each position, where the lobed trailing edge crosses the central plane, there is located a fuel nozzle.

9. A flow straightener and mixing device according to claim 1, comprising:

at least two fuel nozzles located at the trailing edge of at least one of the streamlined bodies and distributed along the trailing edge, wherein at least at one position, where the lobed trailing edge crosses the central plane, there is located a fuel nozzle for injection of a liquid fuel, and wherein at least one fuel nozzle for injection of a gaseous fuel is located essentially at the turning points between two lobes.

10. A flow straightener and mixing device according to claim 1, wherein downstream of said streamlined bodies a mixing zone is located, and wherein at and/or downstream of said streamlined bodies, the cross-section of said mixing zone is reduced, wherein this reduction is at least 10%, compared to the flow cross-section upstream of said streamlined bodies.

11. A flow straightener and mixing device according to claim 1, wherein the body is provided with cooling elements represented by internal circulation of cooling medium along the sidewalls of the body and/or by film cooling holes located near the trailing edge, and wherein the cooling elements are fed with air from the carrier gas feed also used for the fuel injection.

12. A flow straightener and mixing device according to claim 1, wherein the fuel nozzles are circular and/or are elongated slot nozzles extending along the trailing edge of the streamlined body and/or comprise a first nozzle for injection of liquid fuel, and/or a second nozzle for injection of a gaseous fuel and a third nozzle for injection of carrier air, which encloses the first nozzle and/or the second nozzle.

13. Flow straightener and mixing device according to claim 1, wherein a distance between central planes of two streamlined bodies is at least 1.5 times the height (h) of the lobes.

14. Method for operating a flow straightener and mixing device in combination with a burner for a combination chamber of a gas turbine, the fuel straightener and mixing device having:

a structure with walls having a longitudinal axis;

an inlet area;

an outlet area in a main flow direction;

at least two streamlined bodies, which are arranged in the flow straightener and mixing device, each having a streamlined cross-sectional profile, which extends with a longitudinal direction perpendicularly or at an inclination to the main flow direction of the flow straightener and mixing device, wherein a leading edge area of each streamlined body has a profile, which is oriented parallel to the main flow direction at a leading edge position, and wherein, with reference to a central plane of the streamlined bodies the trailing edges are provided with at least two lobes in opposite transverse directions, wherein a transverse deflection from the central plane of two adjacent streamlined bodies, which form the lobes, are inverted, and wherein a transition from a planar leading edge region to the deflection is smooth with a surface curvature representing a function with a continuous first derivative, and at least one of the lobes of the streamlined bodies is configured as an injection device with at least one nozzle for introducing at least one fuel into a burner, wherein the method comprises:

determining a number of fuel injection nozzles through which fuel is injected as function of total injected fuel flow; and injecting fuel through the fuel injection nozzles.

15. Method for operating a flow straightener and mixing device according to claim 14, comprising:

below a fuel flow threshold, injecting fuel flow through every second fuel nozzle of a streamlined body and/or only injecting fuel through the fuel nozzles of every second or third streamlined body of the burner.

16. Method for operating a flow straightener and mixing device according to claim 14, comprising:

conducting combustion of MBtu fuel and/or conducting combustion of hydrogen rich fuel.

17. Method for operating a flow straightener and mixing device according to claim 14 for at least one burner for a combustion chamber of a gas turbine group, wherein the gas turbine group comprises:

at least one compressor unit, a first combustion chamber for generating working gas, wherein the first combustion chamber is connected to receive compressed air from the compressor unit, the first combustion chamber being an annular combustion chamber having a plurality of premixing burners, a first turbine connected to received working gas from the first combustion chamber, a second turbine, a second combustion chamber connected to receive exhausted working gas from the first turbine and deliver working gas to the second turbine, wherein the second chamber comprises an annular duct forming a combustion space extending in a flow direction from outlet of the first turbine to an inlet of the second turbine, and means for introducing fuel into the second combustion chamber for self-ignition of the fuel.

18. Method for operating a flow straightener and mixing device according to claim 14 for at least one burner for a combustion chamber of a gas turbine group, wherein the gas turbine group comprises:

at least one compressor;

at least one combustion chamber; and at least one turbine, wherein the rotating parts of the compressor and of the turbine are arranged on a common rotor.

19. Method for operating a flow straightener and mixing device according to claim 14 for at least one burner for a combustion chamber of a gas turbine group, wherein the gas turbine group comprises:

at least one compressor;

a plurality of cylindrical or quasi-cylindrical combustors arranged in an annular or quasi-annular array on a common rotor; and at least one turbine, and wherein the combustor comprises at least a primary and secondary combustion zones.

* * * * *